United States Patent
Heckerman et al.

(10) Patent No.: US 6,665,653 B1
(45) Date of Patent: Dec. 16, 2003

(54) NOISE REDUCTION FOR A CLUSTER-BASED APPROACH FOR TARGETED ITEM DELIVERY WITH INVENTORY MANAGEMENT

(75) Inventors: David E. Heckerman, Bellevue, WA (US); D. Maxwell Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/565,583

(22) Filed: May 4, 2000

Related U.S. Application Data

(63) Continuation-in-part of application No. 09/430,767, filed on Oct. 29, 1999.
(60) Provisional application No. 60/142,330, filed on Jul. 3, 1999.

(51) Int. Cl.[7] .................................................. G06N 5/04
(52) U.S. Cl. .......................... 706/47; 713/183; 713/184
(58) Field of Search ............................ 706/47; 713/183, 713/184; 370/352

(56) References Cited

U.S. PATENT DOCUMENTS

| | | | |
|---|---|---|---|
| 5,588,056 A | * 12/1996 | Ganesan | 713/183 |
| 5,850,448 A | * 12/1998 | Ganesan | 713/184 |
| 5,864,848 A | 1/1999 | Horvitz | |
| 2003/0086413 A1 | * 5/2003 | Tartarelli et al. | 370/352 |

OTHER PUBLICATIONS

Matsliach, Gabriel, Performance analysis of file organizations that use multi–bucket data leaves with partial expansions (extended abstract), Proceedings of the tenth ACM SIGACT–SIGMOD–SIGART symposium on Principles of database systems, Apr. 1991, pp. 16.*
U.S. application Ser. No. 09/055,477, filed Apr. 6, 1998.
J Platt, Fast Training of SVM's using Sequental Minimal Optimization, MIT Press, Baltimore, 1998.
Sahami, Dumais et al, A Bayesian Approach to Junk Email Filtering, AAAI Technical Report WS–98–05, Jul. 1998.

* cited by examiner

*Primary Examiner*—Wilbert L. Starks, Jr.
(74) *Attorney, Agent, or Firm*—Amin & Turocy, LLP

(57) ABSTRACT

Reduction of noise within a cluster-based approach for item (such as ad) allocation, such as by using a linear program, is described. In one embodiment, probabilities are discretized into a predetermined number of groups, where the mean for the group that a particular probability has been discretized into is substituted for the particular probability when the items are being allocated. In another embodiment, the probabilities are decreased by a power function of the variances for them. In a third embodiment, allocation of items to clusters is not changed unless the sample sizes used to determine the corresponding probabilities for those ads is greater than a threshold. In a fourth embodiment, after allocation is performed a first time, a predetermined number of item are removed, and reallocation is performed.

19 Claims, 6 Drawing Sheets

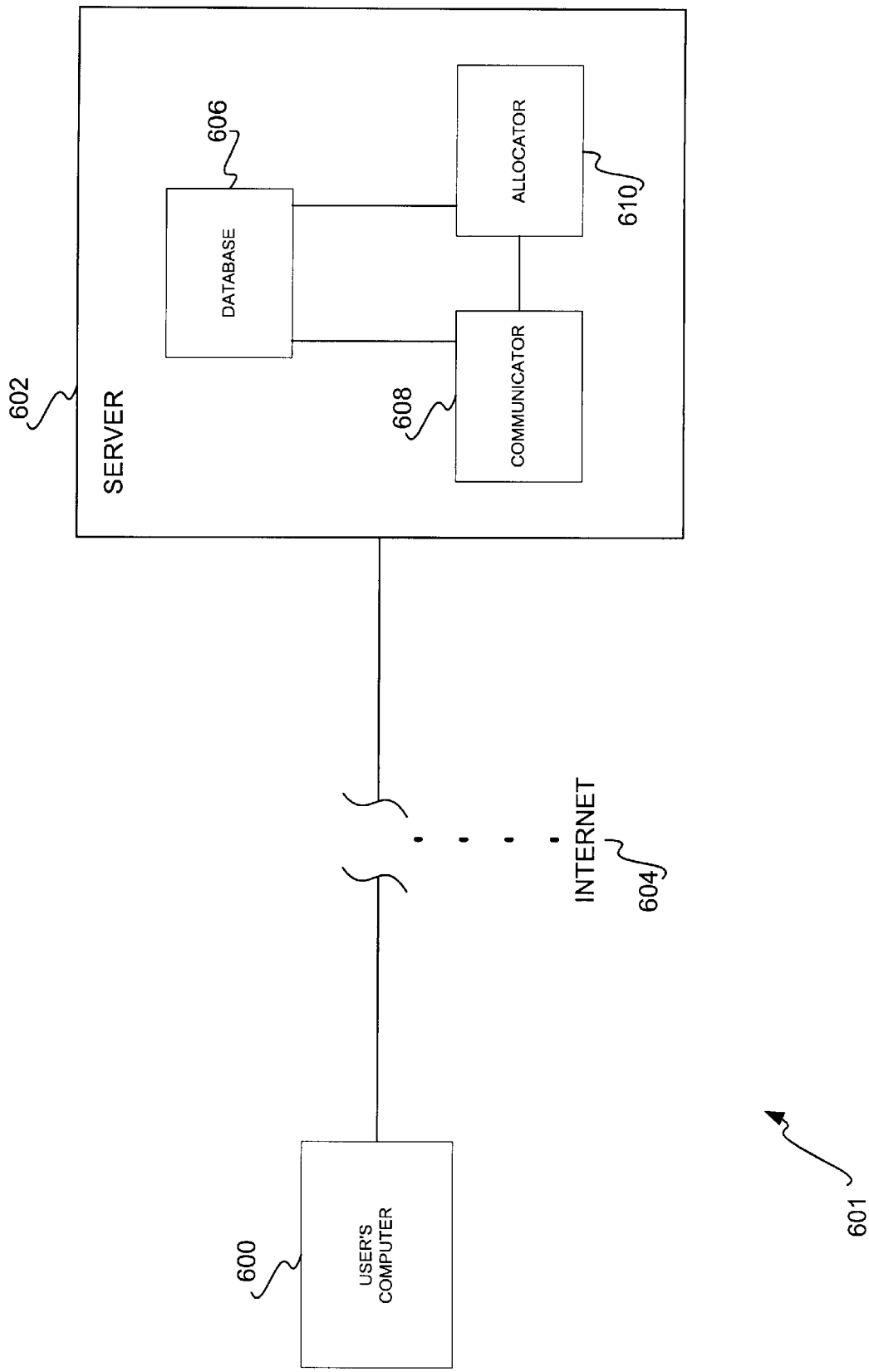

NOISE REDUCTION FOR A CLUSTER-BASED APPROACH FOR TARGETED ITEM DELIVERY WITH INVENTORY MANAGEMENT

RELATED APPLICATIONS

This application claims the benefit of the previously filed, copending and coassigned provisional patent application entitled "A Cluster-Based Approach for Targeted Item Delivery with Inventory Management," filed on Jul. 3, 1999, and assigned Ser. no. 60/142,330. This application is also a continuation-in-part of the previously filed, copending and coassigned patent application entitled "Cluster-Based and Rule-Based Approach for Targeted Item Delivery with Inventory Management," filed on Oct. 29, 1999, and assigned Ser. no. 09/430,767.

FIELD OF THE INVENTION

This invention relates generally to targeted item delivery with inventory management, such as targeted advertising with quotas, and more specifically to reducing noise in a cluster-based approach for such targeted advertising with quotas.

BACKGROUND OF THE INVENTION

The Internet has become increasingly popular with end users, to the extent that advertisers have become attracted to this new medium. A typical type of Internet ad is known as the banner ad, which is generally displayed on the top of each web page. Operators for popular news and other sites, for example, can increase revenue by selling banner ad space to advertisers.

Frequently, advertisers choose sites to pay for banner ad space based on two criteria. First, advertisers pay to have their ads shown to specific types of people. For example, a golf store might want to have its ads shown on a sports-related page, or to people who are likely to be interested in golf based on their browsing history. Second, advertisers pay to have their ads served in such a way that the ads are likely to be "clicked on" by a user, so that the user will be transported to the advertiser's web site. One way to increase revenue generated from web advertising is thus to increase the "click through" rate of the ads shown; sites with higher click-through rates can likely charge more to those advertisers who are interested in attracting people to their web sites. The click-through rate of an ad is the percentage of times a user clicks on the ad to be transported to the advertiser's web site, against the number of times the ad is shown. Advertisers in need of advertising are thus attracted to sites that generate click through, and are usually willing to pay extra to those sites that can deliver increased click through.

One way to increase click through is by targeted advertising. Targeted advertising is the practice of showing ads to individuals based on information about them, such as their web browsing history and demographics, to increase the click-through rate. A difficulty with targeted advertising in the context of web advertising, as well as other advertising environments, is that simply showing each user the ad that will most likely be clicked will typically not be a valid approach. In particular, sites sell ad space to many different advertisers, and all of those contracts must be fulfilled regardless of the click-through rates of the individual ads. Consequently, targeted-advertising approaches must explicitly take into account the number of times that each ad needs to be shown.

Targeted advertising with quotas is one type of process that can generally be referred to as targeted delivery of items with inventory management. Targeted delivery of items with inventory management can itself be generally defined as having an inventory of an item available, such that its inventory is desirably managed to produce an optimal result, such as maximum revenue. For example, in the case of targeted advertising, there is a limited number of ads that can be shown, such that the display of ads to users is desirably managed so that the "click through" rate of the ads is maximized. Another type of inventory management is product or service placement in electronic commerce contexts.

In the pending provisional patent application which the present application has claimed the benefit of, and the pending regular patent application which the present application is a continuation-in-part (CIP) of, a linear program can be used to provide for targeted advertising with quotas. The numbers used to determine the "click through" rate of the ads to be shown can be statistical estimates from past performance. In at least some cases, these statistical estimates are susceptible to noise, which can be amplified by the linear program, reducing the effectiveness of both the linear program and of the targeted advertising provided by the linear program. For this and other reasons, therefore, there is a need for the present invention.

SUMMARY OF THE INVENTION

The invention relates to the reduction of noise within a cluster-based approach to targeted advertising with quotas. In one embodiment, a computer-implemented method allocates each of a number of ads to one or more of a number of clusters. The allocation is made based on a predetermined criterion accounting for at least a quota for each ad and a constraint for each cluster. The former in one embodiment refers to the number of times an ad must be shown. The latter in one embodiment refers to the number of times a given group of web pages—viz., a cluster—is likely to be visited by users, and hence is the number of times ads can be shown in a given cluster. The invention is not limited to any particular definition of what constitutes a cluster, however. The method selects an ad for the current cluster a user is in from the ads allocated to that cluster, and then displays the ad.

Embodiments of the invention employ one or more of several different approaches to reduce noise within the data that may affect the allocation. In one embodiment, probabilities for the ads, where the ads can generally be referred to as items, are discretized into a predetermined number of groups, where the mean for the group that a particular probability has been discretized into can be substituted for the particular probability when the ads are being allocated. The discretization introduces the potential that many solutions may be equally good for the resulting allocation, such that a second optimization may also be performed. In cases where this optimization is difficult to solve, a greedy algorithm approximation of this optimization can be used as well. In another embodiment, the probabilities for the ads are decreased by a power function of the variances for them. This is accomplished so that the allocation does not rely as much on probability estimates that have large variances, which indicate that these estimates have more noise than other probability estimates.

In a third embodiment, allocation of ads to page groups, where page groups are referred to generally as clusters, is not changed unless the sample sizes used to determine the corresponding probabilities for those ads is greater than a threshold. This is accomplished so that allocation is not based on probability estimates determined from low sample sizes, which may not be as accurate as estimates determined from high sample sizes, for example. In a fourth embodiment, after allocation is performed a first time by, for example, using a linear program, a predetermined number of ads are removed, and reallocation is performed by, for example, again using a linear program, to fill the newly emptied slots that result from removal. In this way, ads that are considered poor by some measurement can be eliminated from the allocation into clusters. Each of the embodiments can be performed independently, or in conjunction with any of the other embodiments.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific. exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
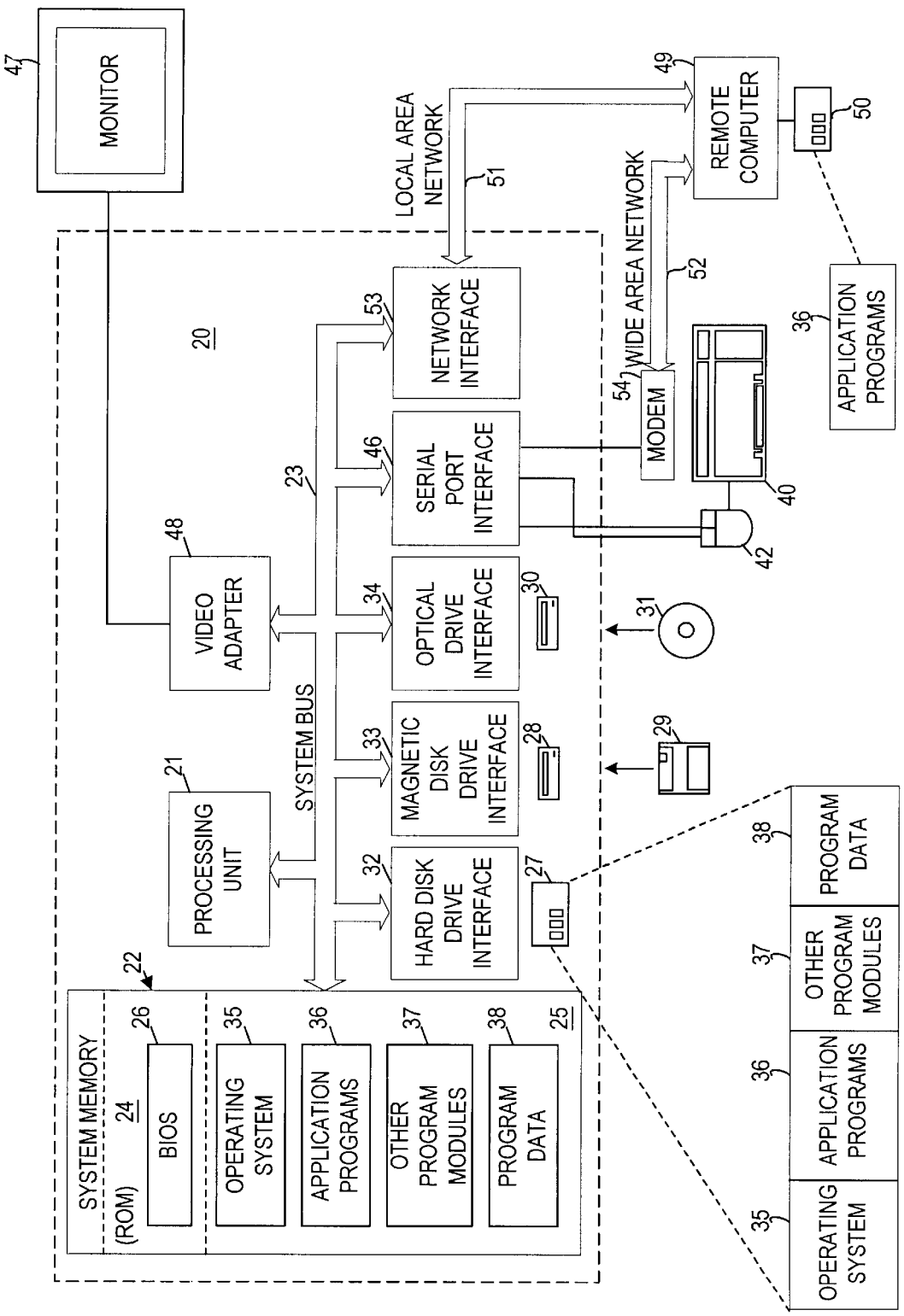
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Applications

In the detailed description, embodiments of the invention are largely described as being related to web-based targeted advertising applications in particular, and targeted advertising applications in general. However, the invention itself is not so limited. Rather, the invention is applicable to any type of commerce-related product or service placement in which an inventory of items must be managed. In the case of targeted advertising applications, the inventory to be managed includes ad impressions. In other inventory management applications, the inventory to be managed can be, for example, products that need to be sold. For example, there may be a limited number of a certain kind of product to be sold, such that the use of an embodiment of the invention describes the best in which to advertise the selling of the products.

Thus, whereas as described in the detailed description, embodiments of the invention are said to pertain to allocating ads within clusters, such that a given ad can be selected and displayed, the invention itself is not so limited. Rather, the invention pertains to allocation of any item, including ads, within clusters, such that a given item can be selected and effected, where in the case of ads, effected means displayed. Besides ads, items can include products, services, etc.; the invention is not limited to a particular type of item. The criteria for assigning items in clusters can include not only ad-showing quotas, but also item-purchase quotas, etc.; again, the invention is not so limited. Furthermore, the effecting of an item can mean other things besides the displaying of an ad, such as the displaying of a button on a web site for immediate purchase of an item, for example; the invention is not particularly limited to a type of effectuation for an item.

Ads and Clusters

In this section, description is provided of the relationship between ads and clusters, according to an embodiment of the invention. However, description of how clusters can be determined is provided in a subsequent section of the detailed description. The description herein is made with reference to FIGS. 2 and 3.

Figure 2:
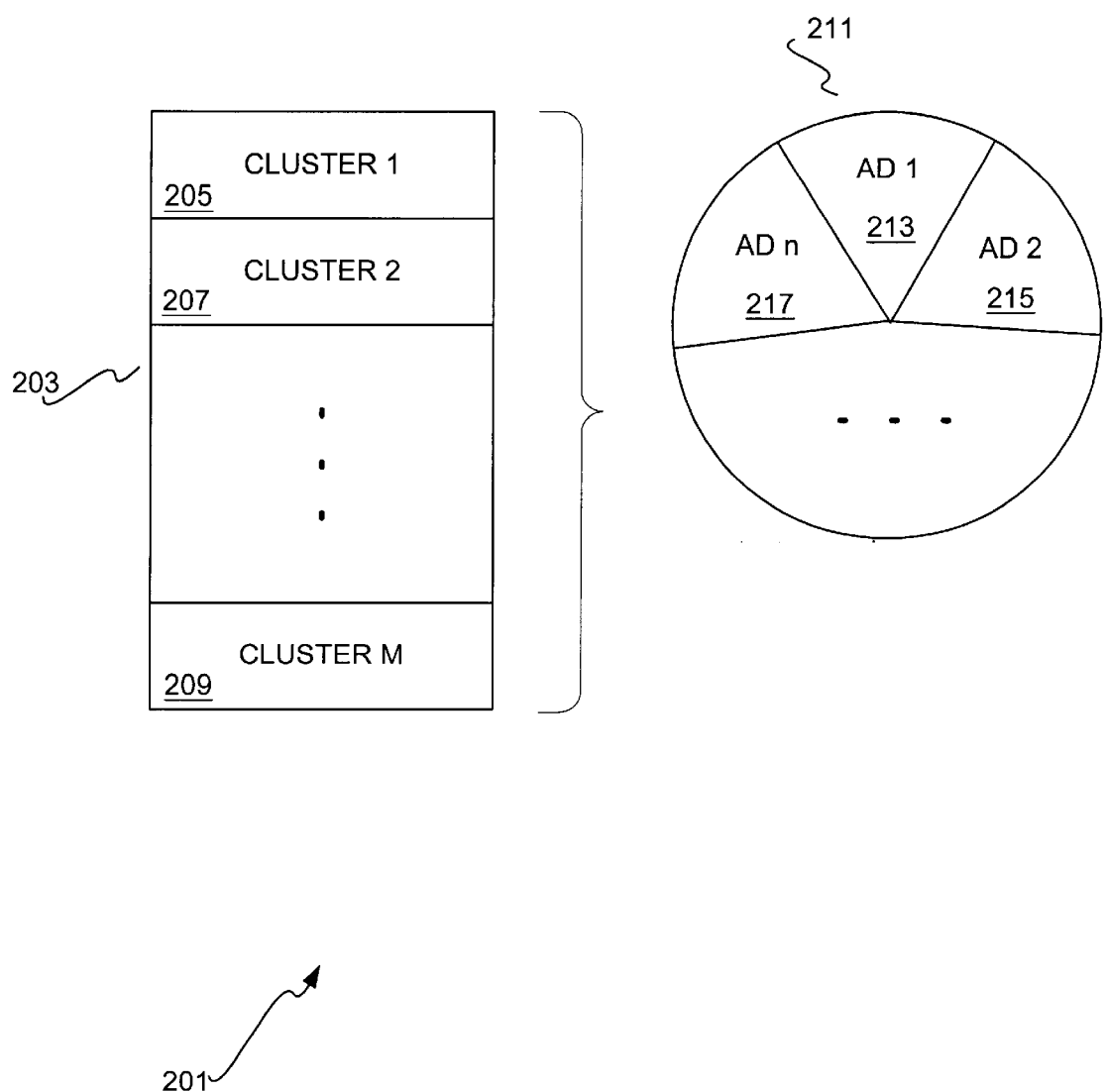
FIG. 2 is a diagram of clusters and ads, according to one embodiment of the invention.

Referring first to FIG. 2, a diagram 201 of clusters and ads is shown, according to one embodiment of the invention. There is a plurality of clusters 1 . . . m, indicated as clusters 203, where cluster 1 is shown as cluster 205, cluster 2 is shown as cluster 207, and cluster m is shown as cluster 209. For each cluster, there is click-through rate associated with each of a plurality of ads 1 . . . n, indicated as ads 211, where ad 1 is shown as ad 213, ad 2 is shown as ad 215, and ad n is shown as ad 217. The click-through rate for an ad i within a cluster j is the probability that a user will actuate the ad i when in cluster j. The term actuate is a generalized term, and in the context of web advertising, refers to the user clicking on the ad—such that the click-through rate in such an instance is the probability that the user will click on the ad, and be transported to the advertiser's web site. In other contexts, actuate may have different meanings; for example, in another embodiment, actuate can mean the user purchasing an item. For any cluster j, each ad i thus has an associated click-through rate, or probability, that is referred to as $p_{ij}$, defined as p(click on ad i|cluster j).

The manner by which $p_{ij}$ is obtained is not limited by the invention. For example, in one embodiment, a maximum likelihood approach can be used, while in another embodiment, MAP (maximum a posteriori) methods, such as using Dirichlet priors, can be used. As another example, in one embodiment a hierarchical Bayesian approach can be used. All of these approaches are known within the art. The approaches assume a set of training data, which provides, for example, the number of pages viewed by users in each cluster—corresponding to the number of impressions in each cluster—as well as the number and identification of ads clicked on in each cluster, and other information, such as demographical information about the users. Using any of these approaches can thus determine $p_{ij}$ for all ads and all clusters from the training data.

For example, in one embodiment, one day's worth of data from a popular large news-related web site is sufficient for learning. The data from such a web site can be organized by records, with one record for each user. The record usually will contain the ads shown to the user, information about whether the user clicked through on each of the ads, and other information about the user such as their browsing history on the site, including the page they are currently viewing, demographical information, etc. Once the model is learned, it is then used on one or more following days for targeted advertising. Models can then be relearned on a regular basis as desired, even using data obtained while targeted advertising was in effect.

The purpose of one embodiment of the invention is to allocate ads within each cluster so that the expected number of clicks on the entire site is maximized, while accommodating for the effects of noise in the underlying data. The invention takes into account, however, a quota associated with each ad, which can be defined as the number of times each ad must be displayed overall within all the clusters—a typical contractual obligation that web site operators have with their advertisers. The invention can also take into account a constraint associated with each cluster, which can be defined as the number of impressions by any user associated with each cluster. That is, this constraint is the number of times a web page within a cluster is viewed by any user, and is typically a fixed value. Thus, each ad $1 \ldots n$ has an associated quota $q_1 \ldots q_n$, respectively, and each cluster $1 \ldots m$ has an associated constraint $c_1 \ldots c_m$, respectively. Each quota and constraint can be for any time duration, such as daily, weekly, etc.

Figure 3:
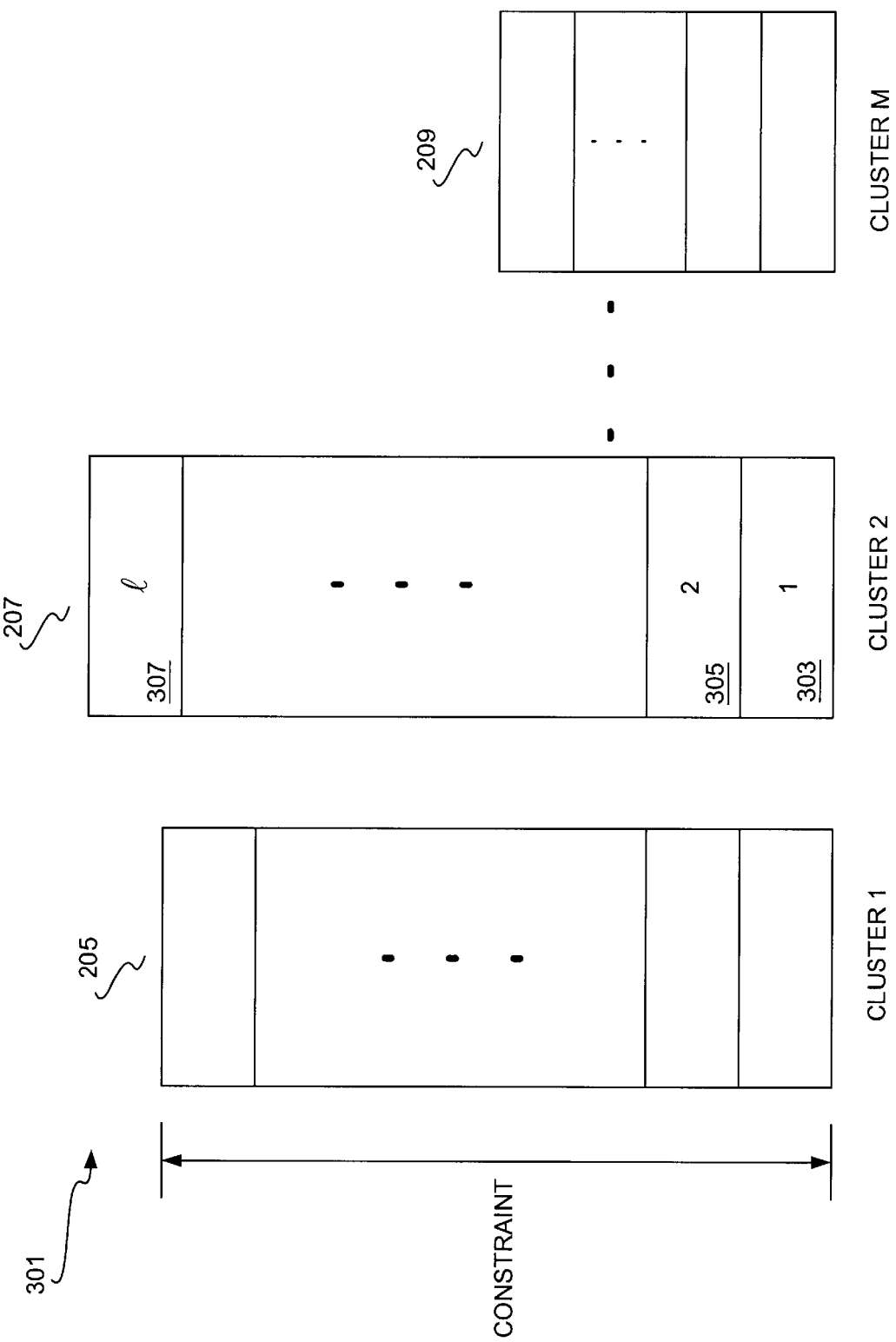
FIG. 3 is a diagram showing the allocation of ads within clusters, according to an embodiment of the invention.

Referring now to FIG. 3, a diagram 301 showing the allocation of ads within clusters is shown. Each cluster $1 \ldots m$, where cluster 1 is shown as the cluster 205 of FIG. 2, cluster 2 is shown as the cluster 207 of FIG. 2, and cluster m is shown as the cluster 209 of FIG. 2, has a number of slots equal to its constraint. Thus, as shown in FIG. 3, the height of a cluster is proportional to its constraint. The cluster 207, for instance, has slots $1 \ldots l$, where slot 1 is shown as slot 303, slot 2 is shown as slot 305, and slot l is shown as slot 307. Allocation of ads within a cluster means filling each slot with an ad, according to a predetermined criterion, to, for example, maximize the number of click throughs of the ads on the site, given the clusters' constraints and the ads' quotas. That is, once the ads within a cluster are determined, the allocation is performed, and the maximization is performed globally. As determined by solving a linear program, as described in the next section of the detailed description, each ad may occupy zero or more slots of a given cluster. Thus, once each slot of each cluster has been filled with an ad, when a user visits a web page within the cluster, an ad from that cluster is displayed. In one embodiment, the ad selected to be displayed is simply by a round-robin process through all the slots within the cluster, while in another embodiment, the ad selected to be displayed is randomly chosen from all the slots within the cluster.

Allocating Ads to Clusters

In this section, description is provided for allocating ads to clusters, according to a predetermined criterion, and accounting for a quota for each ad and a constraint for each cluster. Specifically, the predetermined criterion used herein is to maximize the number of click throughs for all of the ads, given the quotas and constraints. However, variations of the predetermined criterion are possible, and the invention is not particularly limited to maximizing click throughs. Some alternative criteria are presented in subsequent sections of the detailed description.

First, $x_{ij}$ is defined as the number of times ad i is shown in cluster j. To maximize the number of click throughs for all ads, the expression $$\sum_{ij} p_{ij} x_{ij} \tag{1}$$

must be maximized. In one embodiment, this is subject to one or more of the constraints $$\sum_{j} x_{ij} = q_i \tag{2}$$

and $$\sum_{i} x_{ij} = c_j, \tag{3}$$

where the former constraint defines a quota $q_i$ for each ad i and the latter constraint defines an impressions constraint $c_j$ for each cluster j. The expressions (1) through (3) define a linear program. Those of ordinary skill within the art will recognize that this linear program may be solved by any of a variety of methods within the prior art.

In one embodiment, for example, the Simplex Algorithm, which is known within the art, is used. The Simplex Algorithm is an iterative procedure for solving linear programming problems, which include finding the optimum of a linear function subject to a number of linear constraints. The Simplex Algorithm is thus a computational tool for solving linear programming problems, and is able to provide fast solutions to large-scale applications.

Solving the linear program presented above yields the allocation of ads within each cluster, such that the criterion is met—viz., in one embodiment the click-through rate of the ads is maximized. In the next section of the detailed description, different variations are presented.

Variations

In this section of the detailed description, different variations on the allocation of ads to clusters are described. The invention is not particularly limited to a given criterion for allocating ads to clusters, however.

In one variation, a web site may wish to favor some advertisers over other advertisers. For example, the web site may receive greater revenues on a per-displayed ad or per-clicked through ad basis from a given advertiser than from other advertisers. This is accomplished by changing the expression (1) listed above to be maximized to $$\sum_{ij} a_i p_{ij} x_{ij}, \quad (4)$$

where each ad i has a corresponding coefficient $a_1$ to favor or disfavor the ad relative to the other ads. For example, a non-favored/non-disfavored ad may have its coefficient equal to one, which is implied in the original expression (1). A favored ad may have a coefficient greater than one, while a disfavored ad may have a coefficient less than one.

In another variation, allocation of house ads to clusters is provided for. House ads are ads of the web site operator itself, and are typically not paid for and typically promote the web site and/or the operator, for example. House ads may be needed either because the web site operator wishes to include some of its own ads, or because the operator has not sold enough ads to cover all of the slots within all of the clusters. In such an instance, the constraint referenced as expression (3) above becomes $$\sum_i x_{ij} \le c_j \quad (5)$$

to indicate that not all slots within a cluster j can be filled by non-house (i.e., paid-for) ads, where there are a total number of $c_j$ slots.

Once the linear program with this new constraint is solved, then any clusters not filled with non-house ads can be filled by house ads. The invention is not limited to the manner by which house ads fill the remainder of the empty slots in the clusters. In one embodiment, another linear program can be used to optimize the delivery of these ads, too, based on a criterion specified by the web site operator, as can be understood by those of ordinary skill within the art.

In another variation, a given ad i may either never be shown in a cluster j from an analysis of the actual data, or from a perspective that the web site operator and/or the advertiser may not wish the ad i to be shown in the cluster j. For example, an adult-services ad may not be desired to be shown in a children-oriented cluster. To accomplish this, a third constraint is added to the linear program, $x_{ij}=0$ for the ad i desired not to be shown in cluster j. This constraint specifies that the display count for ad i in cluster j is zero.

In another variation, the click-through rate may be desired to be minimized instead of maximized. For example, a web site operator may receive advertiser revenue only for showing ads, and not for having users click on the ads to be transported to the advertiser's own web site. In such an instance, the operator may desire to minimize click throughs, so as to minimize the number of times users are transported away from the operator's own web site. This is accomplished by minimizing the expression (1) listed above, instead of maximizing it, in the linear program.

As can be appreciated by those of ordinary skill within the art, other variations besides those described here are also possible. For example, maximizing the actuation as has been described has been referred to as maximizing the click-through rate of ads. However, other actuations are also possible. It may be desired instead to maximize purchase rates of products or services displayed in the ads, rather than click-through rates. Thus, ads are displayed to users in clusters based on the maximization that a user will purchase the displayed product or service, and not just click on the ad.

As another example of possible variations, it is noted that the description of embodiments of the invention presented herein is generally with respect to a web-advertising model. However, the invention is not so limited. Other advertising models are also encompassed by the invention. For example, for television ads in which goods are advertised that can be ordered by calling a phone number presented in the ad itself, it may be desirable to maximize the actuation of these ads, where actuation can be defined as a viewer calling the number to order the product. That is, the invention is not limited to a particular domain of advertising problem sets.

Defining Clusters

In this section of the detailed description, different manners by which clusters can be defined are described. The invention is not particularly limited to any specific manner for determining clusters, however.

In one embodiment, an impression cluster is defined as corresponding to a particular page group of the current web page being displayed. For example, on news-related web sites, web pages are typically grouped into categories such as international news, national news, local news, weather, sports, entertainment, etc. These categories can be used as the clusters.

Figure 4:
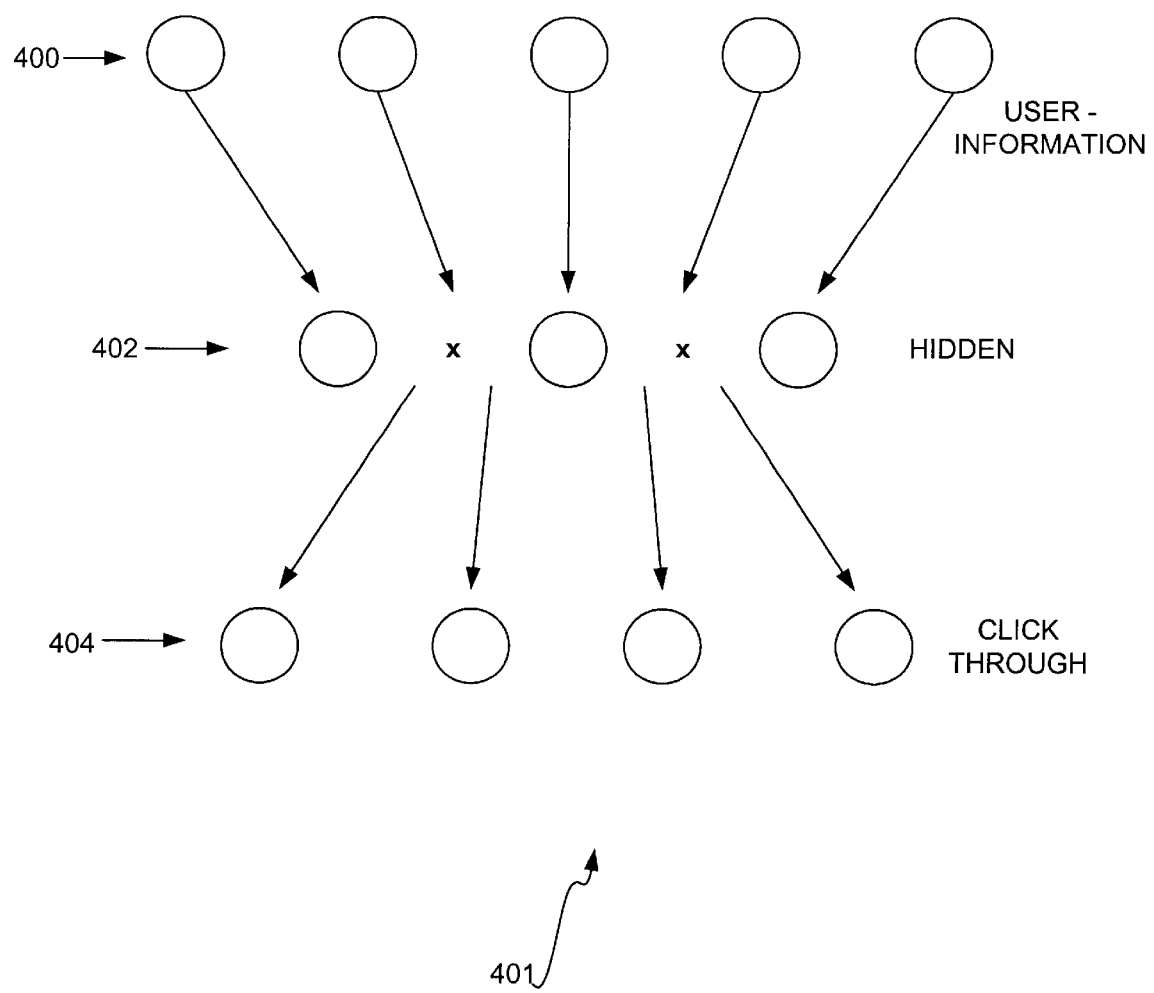
FIG. 4 is a diagram showing how a Bayesian network can be used to determine clusters according to one embodiment of the invention.

In another embodiment, clusters may be constructed from user information, such as browsing history and demographical information, using a naïve-Bayes-net clustering approach, as known within the art. As an alternative, a different Bayesian network architecture (which may also be referred to as a neural-net architecture) may also be used. A typical Bayesian network model 401 for this approach is shown in the diagram of FIG. 4. The top layer of variables 400, corresponds to user information, and is predictive of one or more hidden variables within a middle layer of variables 402. The number of hidden variables within the middle layer is desirably relatively small compared to the number of user information variables within the top layer. For example, there may be between one and ten hidden variables. The hidden variables are themselves predictive of the lower layer of variables 404, which corresponds to whether or not the user clicks through on the ads shown to him or her.

There are at least two specific instances of the architecture that can be used. In one instance, there is a single hidden variable with k values. In the other instance, there are several (l) hidden variables, each with two values. The model of FIG. 4 is sometimes referred to in the art as a bottleneck architecture, since one or more hidden variables are used to summarize a much larger number of user-information variables to predict ad click throughs (or other actuations). Those of ordinary skill within the art will recognize that the model can be trained with a variety of techniques known within the art, such as the stochastic gradient descent technique known within the art. Furthermore, they will recognize that the number of states k (in a first instance of the architecture) and the number of variables l (in a second instance of the architecture) may be determined by trying different values for k or l, and noting whether click through (or whatever criterion is being used) increases for a given test set having a given value for k or l.

An alternative method constructs clusters hierarchically, using a series of bottleneck architectures. First, a bottleneck architecture is created such that the upper layer is as described before and the lower layer contain abstractions of the targets described before. For example, the initial bottleneck architecture may be used such that the lower layer of (abstracted) variables includes "car ads", "drugstore ads", "book-store ads", "florist ads", etc. Once this bottleneck architecture has been used to construct clusters, the data is segmented by these clusters and each segment is recursively subjected to clustering using another bottleneck architecture in which the upper layer is as described before and the lower layer contains less abstract abstractions than in the initial bottleneck architecture. For example, the lower layer of a bottleneck architecture that refines the cluster corresponding to "car ads" may include the variables "BMW ads", "Toyota ads", and "Ford ads". When an ad is to be shown, the system first determines what high level cluster the user is in using the initial bottleneck architecture. If processing time is limited, the ad could be shown based on this cluster alone. However, if additional processing time is available, the second level bottleneck architecture corresponding to the top level cluster of the user can be used to determine the second-level cluster of the user, and the ad shown could be based on this second-level cluster.

In another embodiment, a text classifier is used to group web pages by the text contained within those web pages. The desired number of groups is not limited—for example, there may be about twenty groups. Each group corresponds to a cluster. Text classifiers are known within the art. The text classification methodology may employ different phases of analysis, including feature selection, classifier construction, and mapping classifier outputs to actuations of ads by users.

In one embodiment, the text classification methodology is based on a Bayesian learning approach, as described in the reference M. Sahami, S. Dumais, D. Heckerman, E. Horvitz, A Bayesian Approach to Junk E-Mail Filtering, AAAI Workshop on Text Classification, July 1998, Madison, Wis., AAAI Technical Report WS-98-05. In other embodiments, the text classification methodology is based on a linear Support Vector Machine methodology, as described in the following references: the coassigned patent, U.S. Pat. No. 5,864,848, issued Jan. 26, 1999, which is hereby incorporated by reference; the previously filed and coassigned case entitled "METHODS AND APPARATUS FOR BUILDING A SUPPORT VECTOR MACHINE CLASSIFIER," Ser. No. 09/055,477, filed on Apr. 6, 1998; and, the reference J. Platt, Fast Training of Support Vector Machines using Sequential Minimal Optimization, MIT Press, Baltimore, Md., 1998.

Thus far, it has been implicitly assumed that the information used to determine the clusters for assignment of ads therein includes at least some information that is web-related. Such web-related information may include, for example, previous activity of users on a given web site. However, the invention is not so limited. Clusters can be determined, and ads assigned therein, based on any information, including that which is not web-related at all. For example, credit card information, indicating users' propensity of spending on certain items, may instead be used to define clusters. The invention is not limited to a particular type or kind of information to define clusters.

In another embodiment of the invention, previous user activity in clusters and/or user demographic information that may be obtainable from external sources is not used at all to define the clusters. Rather, the user is provided with the opportunity to fill out a questionnaire, with the benefit that the user's privacy is protected in that his or her activity on the web site is monitored, and/or other information regarding the user is not sought. Then, based on the answers to this questionnaire, clusters are defined. This embodiment also has the advantage of eliminating the need for a user activity monitoring infrastructure on the server side of a web site, rendering web site development easier. The questionnaire may be constructed using prior knowledge alone, or by showing an expert the clusters formed using a bottleneck architecture applied to a sample of data that includes user activity, demographics, etc.

It is noted that cluster definition gives an a priori look at qualified customers that can then be used when approaching advertisers. That is, the cluster analysis provides a priori the best group of users who would view a predetermined ad. This means that advertisers can then be approached with the information that a web site operator can provide a predetermined reception of ads, without the users having yet actually been exposed to the ads. Thus, the web site operator can determine a price differential to charge different advertisers different advertising rates, based on the a priori predetermined reception of users to different advertisers' ads. Each cluster corresponds to a group of users most receptive to a given type of ad. An ad of a particular type is then allocated to the one or more clusters that will provide the ad greatest exposure, or based on some other predetermined criterion.

Reduction of Noise In Ad (Item) Allocation to Page Groups (Clusters)

In the previous sections of the detailed description, a cluster-based approach for allocating items like ads to clusters such as page groups has been described. The probability estimates that are used to determine projected actuation rate, such as projected "click through" rate of ads, are typically statistical estimates from past performance, and therefore may be susceptible to noise. The noise can be amplified by the linear program used in embodiments of the invention. Therefore, in this section of the detailed description, different approaches to reduce noise in the probability estimates when allocating items to clusters are described. Except as modified by the approaches for the reduction of noise as is described herein, however, the approach used to allocate items to clusters as has been described in the previous sections of the detailed description remains the same.

In one embodiment, the original probability estimates are discretized into a predetermined number of groups to assist in noise reduction. As has been described, one criterion for allocating items to clusters is to maximize the expression $$\sum_{ij} p_{ij} x_{ij}$$

under linear constraints, where $p_{ij}$ comprises a probability that a user in cluster j will actuate item i, and $x_{ij}$ comprises a total number of times that item i is effected (e.g., displayed) in cluster j. In this embodiment of the invention, the mean for each group is substituted for the original probability estimates in the linear program when allocation is performed.

That is, rather than maximizing the expression of the previous paragraph, the expression $$\sum_{ij} BucketProb(p_{ij}) x_{ij}.$$

is instead maximized, where $BucketProb(p_{ij})$ is a function that returns the probability associated with the group to which $p_{ij}$ is assigned in the discretization. The function $BucketProb(p_{ij})$ for a particular $p_{ij}$ is dependent only on the particular group into which the particular $p_{ij}$ has been discretized. For example, in one embodiment, the function $BucketProb(p_{ij})$ for a particular $p_{ij}$ comprises the mean of all $p_{ij}$ discretized into the same particular group into which the particular $p_{ij}$ has been discretized, including the particular $p_{ij}$. As an example for illustrative purposes only, if the original estimates are (0.011, 0.012, 0.013, 0.2, 0.21 and 0.5), then these estimates may be discretized into three groups: a first group with members (0.011, 0.012, 0.013) having the mean 0.012; a second group with members (0.2, 0.21) having the mean 0.0205; and a third group with the member (0.5) having the mean 0.5. Thus, in the allocation of items to clusters that can be performed using a linear program as has been described, rather than using the original estimates (0.011, 0.012, 0.013, 0.2, 0.21 and 0.5) the means of the groups into which these estimates have been discretized are substituted therefor—(0.012, 0.012, 0.012, 0.0205, 0.0205 and 0.5).

To discretize the probabilities into a predetermined number of groups, in one embodiment a clustering. approach is used. The particular type of approach is not limited by the invention, however. In one embodiment, a hierarchical agglomerative clustering approach, as known to those of ordinary skill within the art, is used. The number of groups into which the probabilities are discretized is also not limited by the invention. In one embodiment, the number of groups can be determined by trying a different number of groups, and using the number that yields the best performance for out-of-sample data.

It is noted that this discretization can introduce the potential for many solutions for $x_{ij}$ that may be equally good. To exploit this potential, an additional requirement can be introduced, that the allocation of each ad across clusters be as uniform as possible. Thus, after the linear program as has been described in previous sections of the detailed description has been solved with use of discretized probabilities, a second linear program is also solved: maximize the expression $$\sum_{ij} \left| x_{ij} - \frac{q_i}{a_i} \right|,$$

subject to the constraints $$\sum_{ij} x_{ij} = q_i \text{ and } \sum_{ij} x_{ij} = c_j$$

(which are the same constraints as have been described in previous sections of the detailed description), and also subject to the constraint that the overall actuation rate (e.g., "click through" rate) is the same as in the original linear program solution. In this expression and its constraints, $a_i$ comprises a number of clusters for which item i has a non-zero $p_{ij}$ after discretization, $q_i$ comprises a quota for item i as has been previously described, and $c_j$ comprises a constraint for cluster j as has also been previously described. This expression and its constraints represent a second linear program.

It is noted that this second linear program can be difficult to solve. Therefore, in some embodiments of the invention, a greedy approximation is used to solve the program, which in one embodiment is as is now described. In particular, it is noted that, as can be appreciated by those of ordinary skill within the art, the uniformity distance is what is optimized in this second linear program. It is noted that there is already a set of $x_{ij}$ that maximize the expected "click through" or actuation rate, and it is desired to perform the secondary optimization while maintaining this rate. The uniformity distance is minimized to try to spread each item evenly across the clusters. Suppose there are n valid clusters and m items. Further suppose that for item i, $q_i$ of them are to be shown. The approach that serves each ad most uniformly across all clusters serves $$\frac{q_i}{n}$$

of item i in each cluster, and thus the same (possibly fractional) number would be shown in each cluster.

The uniformity distance measures how far away the allocation is from this completely uniform allocation $$\sum_{cluster\ j} \sum_{item\ i} \left| x_{ij} - \frac{q_i}{n} \right|.$$

It is noted that the optimization is to minimize the difference from uniformity, whereas the goal is to maximize actuation rate (e.g., "click through" rate). As has been described, a linear program can be used to optimize the above, including the constraints that the (now known) optimal "click through" or actuation rate is maintained, as well as other constraints, such as cluster capacities and item quotas. A greedy approach is used in one embodiment that swaps items between clusters. In each part of the approach, the uniformity distance decreases, and the actuation rate of the allocation remains the same. Thus, the greedy approach is a (local) optimization of the second linear program, where the optimization involves identifying the assignment of items to clusters that attains an optimal value for a predetermined second criterion, which in one embodiment is the uniformity distance as given in this paragraph.

The greedy approach used in one embodiment is described generally as follows. Let $j_1$ and $j_2$ be two clusters for which some item $i_1$ has the same rate (or adjusted rate). In other words, $p_{i1j1} = p_{i1j2}$. Then, if some of the impressions of item $i_1$ are moved from cluster $j_1$ to cluster $j_2$, then the actuation rate must remain the same. If item $i_1$ is moved, however, the capacity constraint on the cluster is likely to have been violated, and consequently some impressions of a second item $i_2$ (for which $p_{i2j1} = p_{i2j2}$) are moved from cluster $j_2$ to cluster $j_1$.

The greedy approach performs a series of these swaps such that the uniformity distance always decreases. Some aspects about moving items, where all averages are assumed to be integers for illustrative simplicity only, include If $$x_{ij1} > \frac{q_i}{n} \text{ and } x_{ij2} < \frac{q_i}{n}$$

(that is, cluster $j_1$ has more than the average number and cluster $j_2$ has less than the average number), then moving an impression of item i from cluster $_1$ to cluster $j_2$ will decrease the uniformity distance by 2.

If $$x_{ij1} > \frac{q_i}{n} \text{ or } x_{ij2} < \frac{q_i}{n},$$

then moving an impression of item i from cluster $j_1$ to cluster $j_2$ will not decrease the uniformity distance. If exactly one of these conditions hold, then the uniformity distance will remain the same as a result of the move.

Consequently, the most that the distance can be decreased as a result of moving an item i from $j_1$ to $j_2$ is the minimum of $$x_{ij1} - \frac{q_i}{n} \text{ and } \frac{q_i}{n} - x_{ij2}.$$

Furthermore, some impressions of a second item $i_2$ may have to be moved from cluster $j_2$ to cluster $j_1$ in order to keep from violating capacity constraints. The most impressions of item $i_2$ that can be moved from cluster $j_2$ to cluster $j_1$ without increasing the distance is the maximum of $$x_{i2j2} - \frac{q_{i2}}{n} \text{ and } \frac{q_{i2}}{n} - x_{i2j1}.$$

Such a greedy approach can be represented in one embodiment by the following algorithm:

```
Algorithm GreedyAllocation
Inputs:     Allocation (all the x_ij's) that maximize expected actuation rate
            Coefficients for the rates
            (all the p_ij's, which are rates or variance-adjusted rates)
            All quotas and capacities.
Output:     New allocation (x_ij's) that have a low uniformity distance,
            and the same click-through
Label Repeat:
    For each pair of clusters j_1, j_2
        If there an item i that (1) has the same rate in j_1 and j_2 and
            (2) can be moved from j_1 to j_2 without violating the capacity
            constraints and that as a result decreases the uniformity
            distance
                Move as many of item i from j_1 to j_2 such that the above
                    holds. This results in a new x_ij1 and x_ij2.
                Goto Label Repeat:
        Else if there is a pair of items i_1 and i_2 such that
            (1) i_1 has the same rate in both clusters, (2) i_2 has the same rate in both
            clusters, (3) the uniformity distance decreases
            as a result of moving i_1 from j_1 to j_2, and (4) the uniformity
            distance does not increase as a result of moving j_2 to j_1.
                Find the pair i_1,i_2 for which the most swaps can be made
                such that (3) and (4) still hold. Perform this many swaps,
                resulting in a new values for {x_i1j1, x_i1j2, x_i2j1, x_i2j2}.
                Goto Label Repeat:
        // No changes were made
        Return new allocation (x_ij's)
```

Finally, with respect to the greedy approach utilized in one embodiment as has been described, if $x_{ij}$ cannot be changed because of a low sample size—an approach to reduce noise as is described later in this section of the detailed description—then it is said that those $x_{ij}$ impressions of item i are locked, and that cluster j is locked for item i. For each item i that has locked impressions, the $q_i$ is replaced by the quota minus the total number of impressions of items that are locked, and n is replaced by the number of clusters that are not locked by item i. Otherwise, the approach as has been described remains the same, as can be appreciated by those of ordinary skill within the art.

In another embodiment of the invention, noise reduction is achieved by attenuating probability estimates in accordance with a power function of their variance, such that the estimates as attenuated are used in the linear program to allocate items to clusters, as has been described in preceding sections of the detailed description. The effect is that high-variance probability estimates are penalized in the linear program, as compared to low-variance estimates. Thus, the expression $$\sum_{ij} p_{ij} x_{ij}$$

in the linear program as has been described in previous sections of the detailed description is replaced with the expression $$\sum_{ij} (p_{ij} - \beta \, \text{var}^\eta(p_{ij})) x_{ij},$$

where as before $p_{ij}$ comprises a probability that a user in cluster j will actuate item i, and $x_{ij}$ comprises a total number of times item i is effected in cluster j. In addition, $\beta$ and $\eta$ comprise predetermined constants, and $\text{var}(p_{ij})$ comprises a variance of $p_{ij}$. The manner by which the variances are determined is not limited by the invention. In one embodiment, a Dirichlet prior, as known within the art, is used, particularly with a Dirichlet equivalent sample size of 10. In another embodiment, the variance of day-to-day measurements of actuation rates is computed. In one embodiment, the parameters $\beta$ and $\eta$ can be found by trying different values, and using the values that yields the best performance for out-of-sample data. In one embodiment, $\beta=1$ and $\eta=0.5$.

In another embodiment of the invention, noise reduction is achieved in the allocation of items to clusters by not allowing the modification of the allocation of items to clusters unless the sample size used to determine the corresponding probability estimate is greater than a predetermined size. Thus, probability estimates having low underlying sample sizes are presumed to be noisy. That is, the allocation of items to clusters is limited to each item i in cluster j that has a corresponding $p_{ij}$ based on an underlying sample size greater than a predetermined threshold. In one embodiment, the threshold can be found by trying different values, and using the value that yields the best performance for out-of-sample data. In one embodiment, the predetermined threshold is 300.

In another embodiment a predetermined number of items is removed after the linear program is run a first time to allocate items to clusters, and then running the linear program again to fill the newly emptied slots. The slots are newly emptied because, by deleting some items, more of the undeleted items may be shown, and there will be additional slots in some of the clusters to show more items. In one embodiment, the predetermined number of items is a predetermined fraction of the items. The items selected to be removed can in one embodiment be the "worst" items according to any criterion, subject or object. For example, in the case of allocating ads to page groups, the ads with the lowest overall click-through rates can be deleted. Thus, additional slots are opened up such that items that are more likely to be actuated are filled in these slots, such that overall performance can be increased. The reallocation of items to clusters is such that the linear program is run again, but with the predetermined number of items having been removed from the plurality of clusters.

As has been noted, each of the embodiments described in this section of the detailed description can be used independently or together with any of the other embodiments. The embodiments generally are used in conjunction with the allocation of items to clusters as has been already described in detail in previous sections of the detailed description. For example, such allocation of items to clusters can be accomplished by running a linear program, as has been described in previous sections of the detailed description.

Methods

In this section of the detailed description, description of methods according to varying embodiments of the invention is presented. The method is described in conjunction with FIG. 5, which is a flowchart of a method 501 according to an embodiment of the invention. The method 501 can be computer-implemented, in which case it is desirably realized at least in part as one or more programs running on a computer—that is, as a program executed from a computer-readable medium such as a memory by a processor of a computer, such as the computer described already in conjunction with FIG. 1. The programs are desirably storable on a machine-readable medium such as a floppy disk or a CD-ROM, for distribution and installation and execution on another computer.

Figure 5:
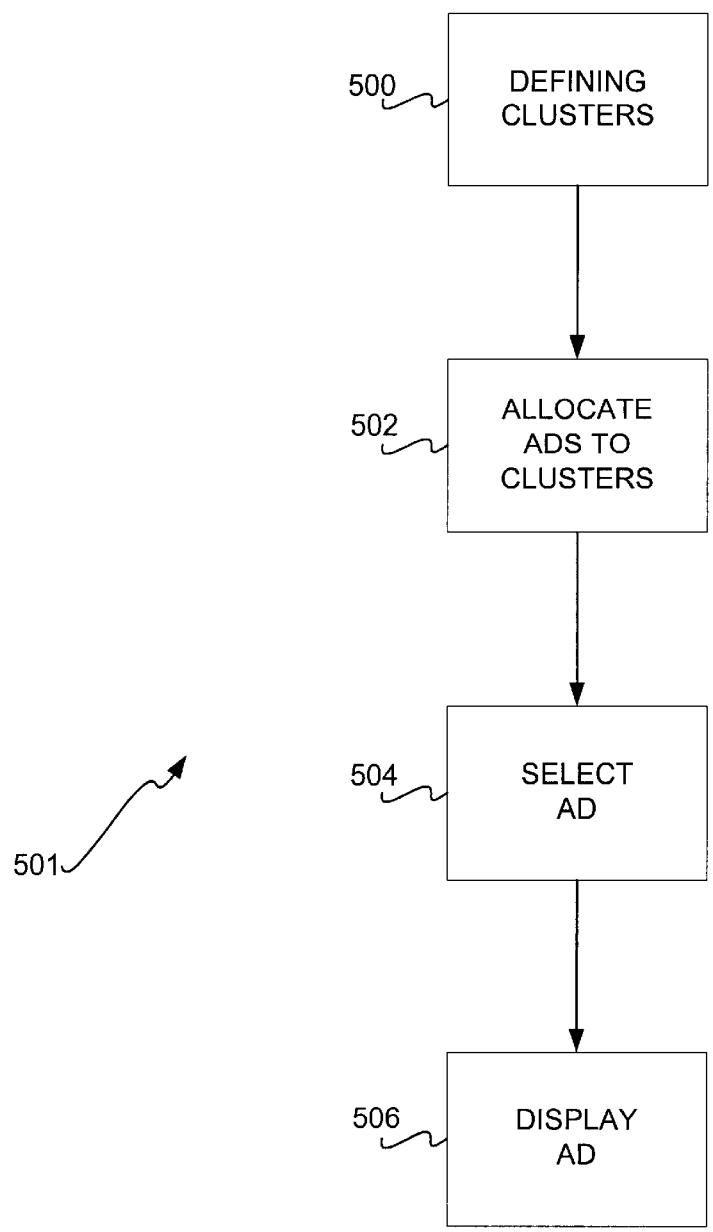
FIG. 5 is a flowchart of a method according to an embodiment of the invention; and, FIG. 6 is a diagram of a system according to an embodiment of the invention.

Referring now to FIG. 5, in 500 of the method 501, a plurality of clusters is first defined. The plurality of clusters is defined in one embodiment as described in a previous section of the detailed description. For example, a preexisting plurality of groups can be used as the plurality of clusters, or the clusters may be determined by approaches such as utilizing a Bayesian network with one or more hidden nodes. The invention is not so limited.

In 502, each of a plurality of ads is allocated to one or more of the clusters, based on a predetermined criterion accounting for a quota for each ad and/or a constraint for each cluster. The allocation is performed in one embodiment as described in a previous section of the detailed description. For example, the expression (1) listed above can be maximized, subject to the constraints of the expressions (2) and (3) also listed above, by solving a linear program using the Simplex Algorithm. Allocation is performed in one embodiment by initially determining for each ad in each cluster a probability that a user in the cluster will actuate the ad if displayed—that is, click on the ad, etc. This initial determination can be made from training data that is inputted, and utilizing a technique such as a maximum likelihood approach, a MAP method approach, or a hierarchical Bayesian approach, as has been described. Furthermore,; the allocation of ads can be modified per the embodiments of the invention described in the previous section of the detailed description, so as to decrease noise that can be amplified by the linear program.

As has also been described, the predetermined criterion is not limited to the expressions (1) through (3) listed above, but can be varied. For example, one or more ads can be favored, one or more house ads can be accounted for, etc. As another example, the expression (1) can be minimized instead of maximized, and actuation can be used to refer to something other than click through, as has been described. In one embodiment, following 502, the allocation of each ad to at least one of the plurality of clusters is then output, which is not explicitly shown in FIG. 5. Outputting may include displaying or printing for review the ad allocation to the clusters, for example; the invention is not so limited.

In 504, an ad for a current cluster which a user is in is selected from the ads allocated to that cluster. As has been described, this can be accomplished by randomly selecting an ad from those allocated to the slots of the cluster, or going round-robin through all the slots of that cluster. Finally, in 506, the ad is displayed on the web page that the user has selected for viewing.

It is noted that as has been described thus far in the application, embodiments of the invention are related to a computer implementation. However, the invention is also applicable to and encompasses business methods, as well as other methods. Thus, a business method can incorporate one or more of the following: defining clusters as has been described; allocating ads to clusters as has been described; and, selecting an ad for display, as has been described. The invention itself is particularly delineated by the claims appended to the end of this detailed description, as those of ordinary skill within the art can appreciate.

System

In this section of the detailed description, a description of a system according to an embodiment of the invention is provided. The description is made with reference to FIG. 6, which is a diagram of a system 601 according to an embodiment of the invention. Referring now to FIG. 6, the system 601 includes a user's computer 600 and a server 602. The user's computer 600 is communicatively coupled to the server 602—as shown in FIG. 6, specifically through the Internet 604, as known within the art. A user thus uses the computer 600 in one embodiment to request a particular web page, which the server 602 returns to the user for viewing on the computer 600. The web page includes a targeted banner ad, determined and selected in accordance with embodiments of the invention as has been described. In one embodiment, either the computer 600 and/or the server 602 comprises a computer as has been described in the section of the detailed description describing FIG. 1, above.

The server 602 includes a database 606, a communicator 608, and an allocator 610. The database 606 stores a plurality of ads, where each ad has an associated quota. The allocator 610 allocates each of the plurality of ads to at least one of a plurality of clusters, based on a predetermined criterion accounting for at least the quota for each ad and a constraint for each cluster, as has been described. The allocator 610 in one embodiment also attenuates noise as has been described in a preceding section of the detailed description. The communicator 608 selects an ad for a current cluster from ads allocated to the current cluster, and outputs the ad to the user as described in the preceding paragraph— for example, for viewing in conjunction with a particular web page categorized in the current cluster.

In one embodiment, the database 606 is stored as data on a computer-readable medium such as a memory or a hard disk drive. Furthermore, in one embodiment, the allocator 610 and/or the communicator 608 includes a computer program executed from a computer-readable medium by a processor. Each of the allocator 610 and the communicator 608 may also be one or more software components or objects of a computer program, one or more parts of a computer programs, or may be implemented as one or more computer programs. The invention is not so limited.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A computer-implemented method comprising:
allocating each of a plurality of items to at least one of a plurality of clusters, based on a predetermined criterion accounting for at least a quota for each item and comprising at least maximizing an expression $$\sum_{ij} BucketProb(p_{ij})x_{ij},$$

where $p_{ij}$ comprises a probability that a user in cluster j will actuate item i, BucketProb($p_{ij}$) comprises a function that returns a probability associated with a group to which $p_{ij}$ is assigned in a discretization, and $x_{ij}$ comprises a total number of times item i is effected in cluster j;
   selecting an item for a current cluster from items allocated to the current cluster; and,
   effecting the item.

2. The method of claim 1, further initially comprising discretizing all $p_{ij}$ into a predetermined number of groups, such that BucketProb(•) for a particular $p_{ij}$ that has been discretized into a particular group is dependent only on the particular group.

3. The method of claim 2, wherein BucketProb(•) for a particular $p_{ij}$ that has been discretized into a particular group comprises a mean of all $p_{ij}$ discretized into the particular group, including the particular $p_{ij}$.

4. The method of claim 2, wherein discretizing all $p_{ij}$ into a predetermined number of groups comprises utilizing a predetermined clustering approach.

5. The method of claim 4, wherein the predetermined clustering approach comprises a hierarchical agglomerative clustering approach.

6. The method of claim 1, wherein allocating each of the plurality of items to at least one of a plurality of clusters further comprises maximizing a second expression $$\sum_{ij} \left| x_{ij} - \frac{q_i}{a_i} \right|,$$

where $q_i$ comprises a quota for item i, and $a_i$ comprises a number of clusters for which item i has a non-zero $p_{ij}$ after discretization.

7. The method of claim 6, wherein maximizing the second expression comprises maximizing the second expression subject to a first constraint $$\sum_j x_{ij} = q_i,$$

and a second constraint $$\sum_i x_{ij} = c_j,$$

where $c_j$ comprises a constraint for cluster j, such that the expression, the first constraint and the second constraint define a linear program.

8. The method of claim 6, wherein maximizing the second expression comprises maximizing an optimization of the second expression.

9. The method of claim 8, wherein the optimization comprises identification of an allocation of items to clusters attaining an optimal value for a predetermined second criterion.

10. The method of claim 9, wherein the predetermined second criterion comprises minimizing $$\sum_j \sum_i \left| x_{ij} - \frac{q_i}{n} \right|,$$

over all clusters j and all items i, where n comprises a number of valid clusters.

11. The method of claim 1, wherein the predetermined criterion comprises further maximizing the expression subject to a first constraint $$\sum_j x_{ij} = q_i,$$

where $q_i$ comprises a quota for item i, and a second constraint $$\sum_i x_{ij} = c_j,$$

where $c_j$ comprises a constraint for cluster j, such that the expression, the first constraint and the second constraint define a linear program.

12. A computer-implemented method comprising:
allocating each of a plurality of items to at least one of a plurality of clusters, based on a predetermined criterion accounting for at least a quota for each item and comprising at least maximizing an expression $$\sum_{ij} (p_{ij} - \beta\, \text{var}^\eta(p_{ij}))x_{ij},$$

where $p_{ij}$ comprises a probability that a user in cluster j will actuate item i, $\beta$ and $\eta$ comprise predetermined constants, var($p_{ij}$) comprises a variance of $p_{ij}$, and $x_{ij}$ comprises a total number of times item i is effected in cluster j;
   selecting an item for a current cluster from items allocated to the current cluster; and
   effecting the item., 13. The method of claim 12, wherein the variance is determined using a Dirichlet prior.

14. The method of claim 12, wherein the variance is determined by measurement over time.

15. The method of claim 12, wherein the predetermined criterion comprises further maximizing the expression subject to a first constraint $$\sum_j x_{ij} = q_i,$$

where $q_i$ comprises a quota for item i, and a second constraint $$\sum_i x_{ij} = c_j,$$

where $c_j$ comprises a constraint for cluster j, such that the expression, the first constraint and the second constraint define a linear program.

16. A computer-implemented method comprising:
   allocating each of a plurality of items to at least one of a plurality of clusters, based on a predetermined criterion accounting for at least a quota for each item, and comprising maximizing an expression $$\sum_{ij} p_{ij} x_{ij},$$

where $p_{ij}$ comprises a probability that a user in cluster j will effect item i and $x_{ij}$ comprises a total number of times item i is effected in cluster j, subject to a first constraint $$\sum_j x_{ij} = q_i,$$

where $q_i$ comprises a quota for item i, and a second constraint $$\sum_i x_{ij} = c_j,$$

where $c_j$ comprises a constraint for cluster j, such that the expression, the first constraint and the second constraint define a linear program, and limited to each item i in cluster j having a corresponding $p_{ij}$ based on an underlying sample size greater than a predetermined threshold;
   selecting an item for a current cluster from items allocated to the current cluster; and,
   effecting the item.

17. A computer-implemented method comprising:
   allocating each of a plurality of items to at least one of a plurality of clusters, based on a predetermined criterion accounting for at least a quota for each item;
   removing a predetermined number of the plurality of items from the plurality of clusters;
   reallocating each of the plurality of items, minus the predetermined number of the plurality of items that have been removed from the plurality of clusters, to at least one of the plurality of clusters, based on the predetermined criterion;
   selecting an item for a current cluster from items allocated to the current cluster; and,
   effecting the item.

18. The method of claim 17, wherein the predetermined criterion comprises, maximizing an expression $$\sum_{ij} p_{ij} x_{ij},$$

where $p_{ij}$ comprises a probability that a user in cluster j will effect item i and $x_{ij}$ comprises a total number of times item i is effected in cluster j, subject to a first constraint $$\sum_j x_{ij} = q_i,$$

where $q_i$ comprises a quota for item i, and a second constraint $$\sum_i x_{ij} = c_j,$$

where $c_j$ comprises a constraint for cluster j, such that the expression, the first constraint and the second constraint define a linear program.

19. The method of claim 18, wherein the predetermined criterion comprises further maximizing the expression subject to a first constraint $$\sum_j x_{ij} = q_i,$$

where $q_i$ comprises a quota for item i, and a second constraint $$\sum_i x_{ij} = c_j,$$

where $c_j$ comprises a constraint for cluster j, such that the expression, the first constraint and the second constraint define a linear program.

* * * * *